United States Patent [19]
Burnett

[11] 3,942,611
[45] Mar. 9, 1976

[54] DISC BRAKE AND MOUNTING STRUCTURE THEREFOR

[75] Inventor: Richard T. Burnett, South Bend, Ind.

[73] Assignee: The Bendix Corporation, South Bend, Ind.

[22] Filed: May 20, 1974

[21] Appl. No.: 471,266

[52] U.S. Cl. .............................. 188/73.3
[51] Int. Cl.² ......................... F16D 65/04
[58] Field of Search ........ 188/73.3, 73.4, 72.4, 72.5

[56] References Cited
UNITED STATES PATENTS

| | | | |
|---|---|---|---|
| 3,155,194 | 11/1964 | Gancel | 188/73.3 X |
| 3,580,361 | 5/1971 | Eggstein et al. | 188/72.4 |
| 3,625,314 | 12/1971 | Rinker | 188/73.3 X |
| 3,682,277 | 8/1972 | Brown | 188/73.3 |
| 3,805,925 | 4/1974 | Schoenhenz | 188/73.3 |

FOREIGN PATENTS OR APPLICATIONS

| | | | |
|---|---|---|---|
| 717,350 | 10/1954 | United Kingdom | 188/72.5 |

Primary Examiner—George E. A. Halvosa
Attorney, Agent, or Firm—Ken C. Decker; William N. Antonis

[57] ABSTRACT

A disc brake for an automotive vehicle is disclosed. The brake includes a unique floating connection between the caliper and the steering knuckle of the vehicle which includes a sleeve which extends through an aperture in the caliper and a bolt which extends through the sleeve to fasten the latter to the steering knuckle. A tongue-in-groove connection is provided between the caliper and the steering knuckle to prevent rotation of the caliper about the sleeve. This design provides a brake which may be manufactured at lower cost than some prior art brakes, because the brake is designed so that manufacturing tolerances are less critical.

6 Claims, 6 Drawing Figures

DISC BRAKE AND MOUNTING STRUCTURE THEREFOR

BACKGROUND OF THE INVENTION

This invention relates to a disc brake for an automotive vehicle.

The floating connection between the caliper and the fixed supporting member of a typical disc brake design provides a pair of pin-like elements which extend through apertures in the caliper member to fasten the latter to the fixed support. The caliper can, therefore, slide upon the pin-like elements when a brake element is affected. However, since substantial actuating torque must be transmitted through these pin-like elements to the fixed support, only a very small clearance between the pin-like elements and the caliper can be tolerated. Consequently, the distance between the apertures in this type of brake must be held to extremely tight tolerances, which is difficult to accomplish in a typical manufacturing situation.

SUMMARY OF THE INVENTION

Therefore, an important object of my invention is to simplify the flotation system of a disc brake so that the brake may be manufactured at a lower cost.

Another important object of my invention is to provide a disc brake in which only a single pin-like element is required to slidably support the caliper on the torque member.

Another important object of my invention is to provide a disc brake in which a pin-like element slidably supports the caliper for transverse relative movement with respect to the rotor and in which a tongue-in-groove connection between the caliper and the fixed support member prevents rotation of the caliper about the pin-like element.

Still another important object of my invention is to provide a disc brake in which the fixed supporting member is integral with the conventional steering knuckle, and which requires only minimum changes in the design of the steering knuckle.

DETAILED DESCRIPTION

Figure 1:
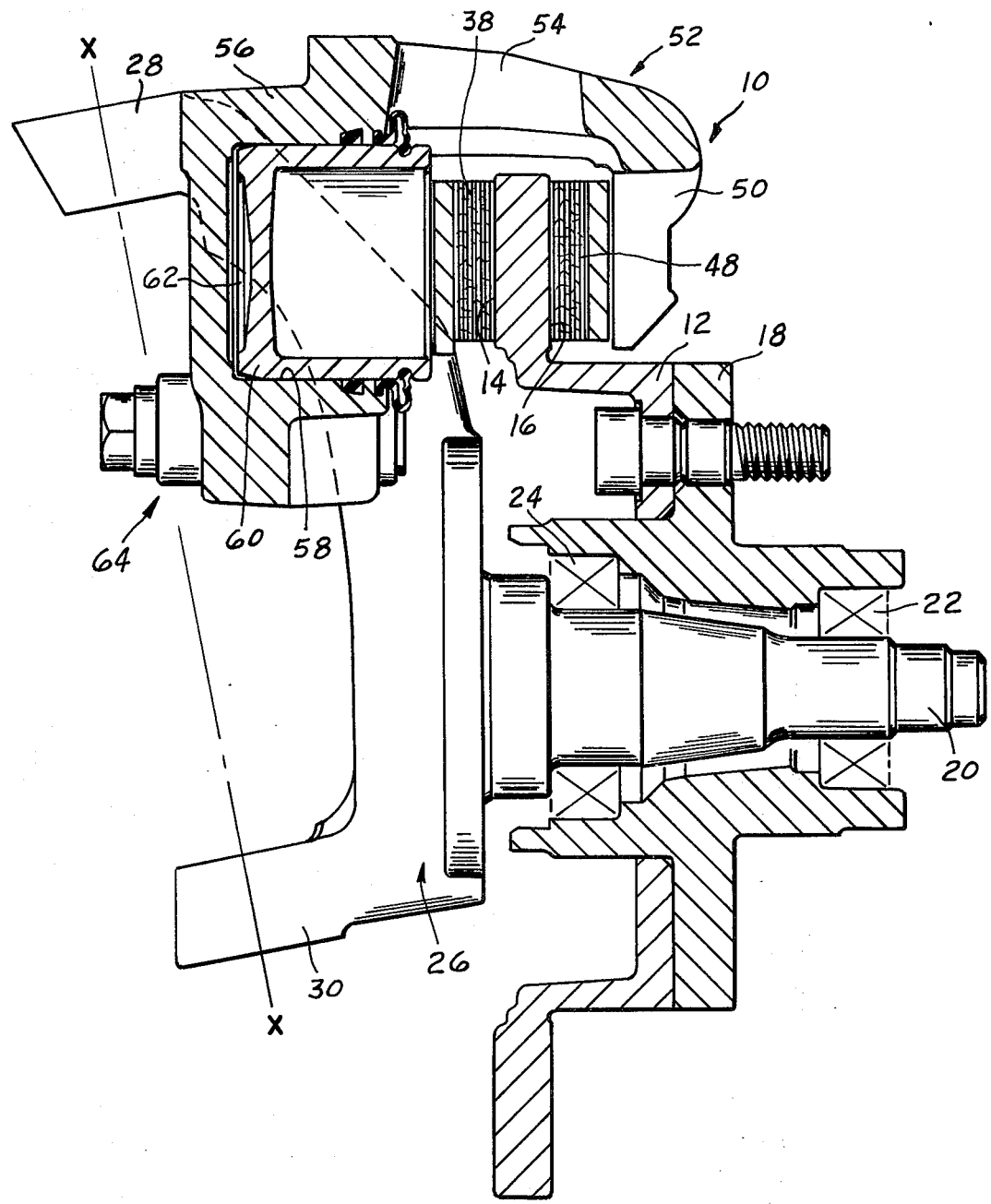
FIG. 1 is a cross sectional view taken through the steering knuckle of a vehicle and which illustrates a disc brake made pursuant to the teachings of my present invention.
Figure 2:
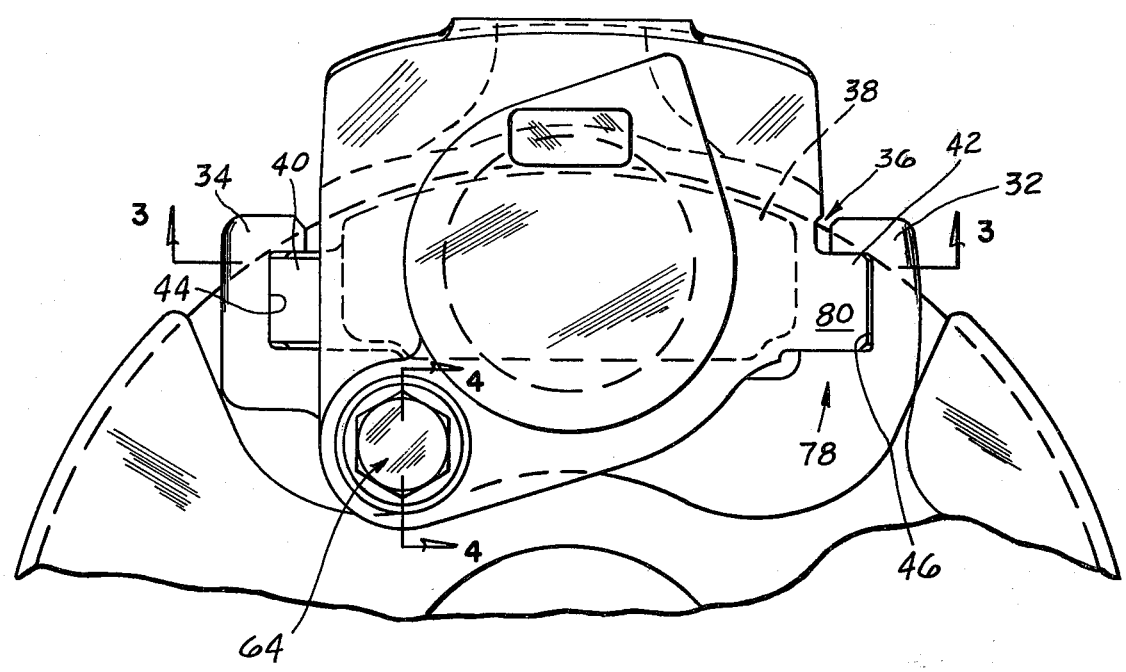
FIG. 2 is a side elevational view of the brake illustrated in FIG. 1.

Referring now to the drawings, the disc brake generally indicated by the numeral 10 includes a rotor 12 having a pair of opposed friction faces 14 and 16. The rotor 12 is fastened for rotation with a vehicle hub 18, which is rotatably supported on a spindle 20 by bearings 22, 24. The nonrotating spindle is made integral with the vehicle steering knuckle generally indicated by the numeral 26. The steering knuckle 26 includes an upper ball joint support 28 and a lower ball joint support 30. The steering knuckle 26 is fastened for articulation with respect to the vehicle about the axis X—X through appropriate ball joint connections between the supports 28 and 30 and the associated parts of the vehicle (not shown). A steering arm (not shown) interconnects the steering knuckle 26 with the steering linkage of the vehicle so that the steering knuckle 26 may be pivoted about the axis X—X when the vehicle is steered.

The steering knuckle 26 includes a pair of arms 32, 34 which define a recess 36 therebetween. A friction element 38 is disposed within the recess 36 adjacent to the friction face 14 of the rotor 12 and includes a pair of tabs 40, 42 on opposite ends thereof which are received within grooves 44, 46 which are machined in the arms 32 and 34 respectively.

Another friction element 48 is disposed adjacent the friction face 16 and is secured to inwardly extending portion 50 of a caliper generally indicated by the numeral 52. The caliper 52 further includes a bridge portion 54 which straddles the periphery of the rotor 12 and which interconnects the inwardly extending portion 50 with a fluid motor portion 56, which is disposed adjacent the friction element 38. Fluid motor portion 56 defines a bore 58 therewithin which slidably receives a fluid piston 60. The rear face of the piston 60 cooperates with the rear wall of the bore 58 to define a variable volume fluid chamber 62 therewithin which is communicated to any appropriate source of fluid pressure, such as the vehicle master cylinder (not shown). The piston 60 further engages the friction element 38, and is adapted to urge the latter into frictional engagement with the friction face 14. The caliper 52 is slidably mounted on the steering knuckle 26 by the pin-like element generally indicated by numeral 64. The pin-like element 64 mounts the caliper 52 for transverse relative movement with respect to the rotor 12. Consequently, when the friction element 38 is urged into frictional engagement with the friction face 14, because of the slidable connection between the caliper 52 and the steering knuckle 26, reaction forces transmitted through the bridge portion 54 and inwardly extending portion 50 will also urge the friction element 48 into braking engagement with its corresponding friction face 16.

Figure 4:
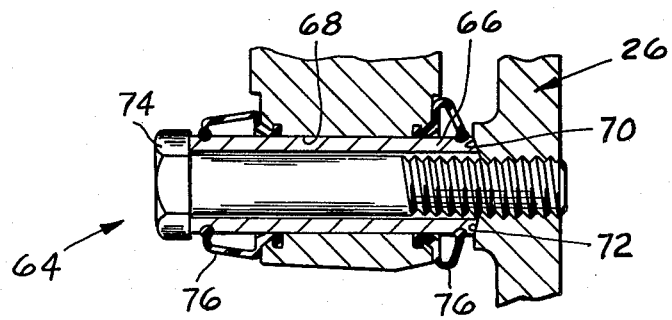
FIG. 4 is a fragmentary cross sectional view taken substantially along line 4—4 in FIG. 2.

The pin-like element 64 is most clearly shown in FIG. 4. Element 64 includes a sleeve 66 which is slidably received within an aperture 68 provided in the caliper 52. The circumferential surface of the aperture 68 defines a bearing surface which cooperates with the bearing surface defined on the outer circumferential surface of the sleeve 66 to transmit a substantial portion of the braking torque to the steering knuckle 26 through the sleeve 66. Because the braking torque can be quite high, there must be a relatively close sliding fit between the sleeve 66 and aperture 68, but this type of sliding fit is not difficult to accomplish commercially. The inner end of the sleeve 66 is tapered as at 70, and engages a corresponding socket 72 provided in the steering knuckle 26. A bolt 74 extends through the sleeve 66 and is fastened to the steering knuckle 26 to thereby retain the sleeve 66 to the knuckle 26. It is noted that the clearance between the bolt and the sleeve is not critical since the sleeve is held to the steering knuckle 26 by the axial force between the head of the bolt and the end of the sleeve. Appropriate boots 76 are provided to keep dirt and other contaminants from interfering with the sliding action of the caliper 52 upon the sleeve 66.

Figure 3:
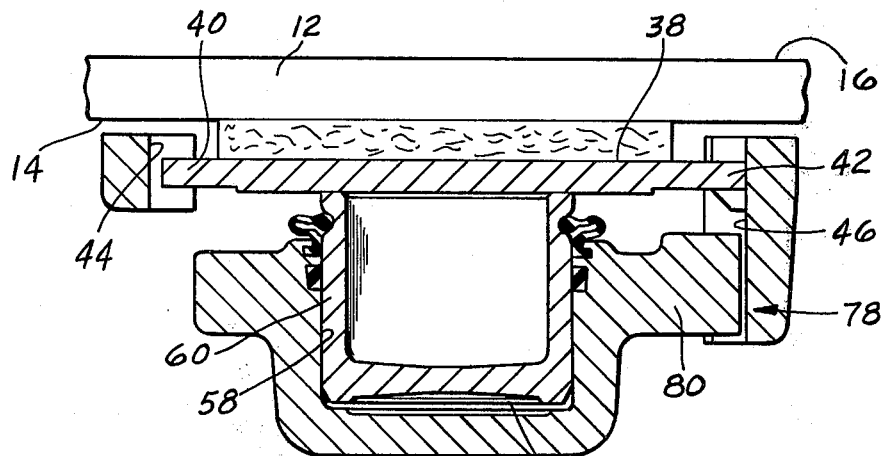
FIG. 3 is a cross sectional view taken substantially along line 3—3 of FIG. 2.

To prevent rotation about the pin-like element 64 during braking, the caliper 52 is restrained by a tongue-in-groove connection generally indicated by the numeral 78 between the caliper 52 and the arm 32 of the knuckle 26. As can be seen most clearly in FIG. 3, the groove 46 in the arm 32 is axially longer than is the groove 44 in the arm 34, and thus the groove 46 defines the groove portion of the tongue-in-groove connection 78. A projection 80 extends from the caliper 52 and is received in the groove 46 to thereby define the tongue portion of the tongue-in-groove connection 78. It will be noted that the clearances between the projection 80 and the groove 46 are not critical, nor is the distance between the tongue-in-groove connection 78 and the pin-like member 64 a critical dimension. Since there are no critical dimensions that must be held to close tolerances, the caliper member 52 may be manufactured relatively inexpensively.

In operation, a brake application is effected by communicating fluid pressure into the chamber 62 as described hereinabove to urge the friction elements 38 and 48 into braking engagement with their corresponding friction faces 14, 16. The braking torque generated by the engagement of the friction element 38 and the friction face 14 is taken through the projections 40 and 42 and the arms 32, 34, depending upon the direction of rotation of the rotor 12. The braking torque generated by engagement of the friction element 48 with the friction face 16 is transmitted through the caliper 52 to the pin-like member 64. The largest portion of this braking torque generated by the friction element 48 is taken by the pin-like member 64, and a force will be generated against the side of the groove 46 in the tongue-in-groove connection 78, which prevents rotation of the caliper 52 about the pin-like member 64.

DETAILED DESCRIPTION OF THE ALTERNATE EMBODIMENT

Figure 5:
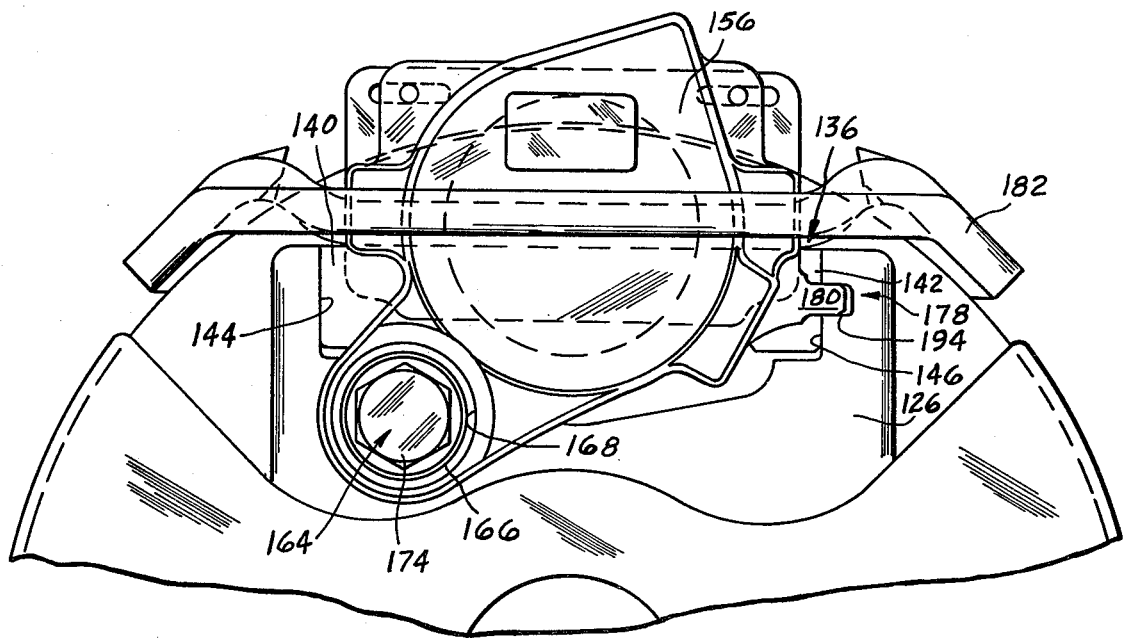
FIG. 5 is a side elevational view similar to FIG. 2 but illustrating a different embodiment of my invention.
Figure 6:
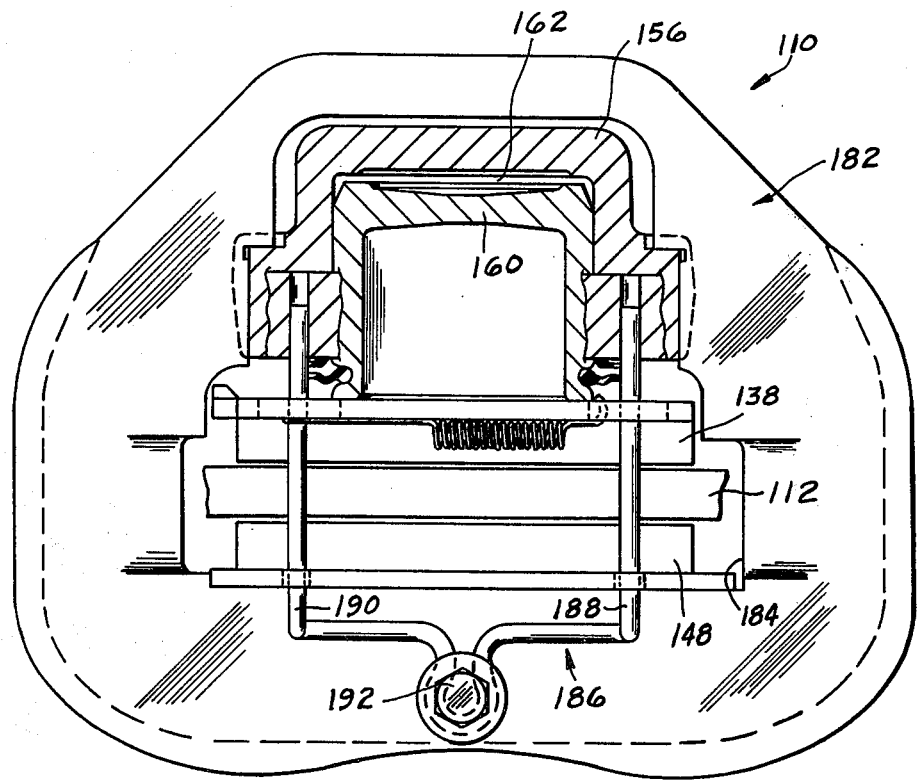
FIG. 6 is a top plan view, partly in section, of the brake illustrated in FIG. 5.

Referring now to the embodiment of FIGS. 5 and 6, elements substantially the same as those in the preferred embodiment retain the same reference character, but increased by 100. In the embodiment of FIGS. 5 and 6, the portions of the caliper 52 in the preferred embodiment which extend across the rotor 112 is replaced by a yoke 182 which circumscribes the friction elements 138, 148 and the fluid motor portion 156. Consequently, upon actuation of the brake by communication of fluid pressure into the chamber 162, the friction element 138 will be urged into engagement with the rotor 112 in exactly the same manner as in the preferred embodiment. The reaction forces will be transmitted through the yoke member 182 to also urge the friction element 148 into engagement with the rotor 112. An opening 184 is provided in the yoke member 182 over the periphery of the rotor 112 which exposes the upper edges of the friction elements 138 and 148 so that they may be removed for servicing when repeated brake applications have worn the friction material away. The friction elements 138, 148 are retained in the yoke 182 by a bent wire retainer generally indicated by the numeral 186 which has a pair of legs 188, 190 which extend through appropriate apertures in the friction elements 138 and 148 and into the fluid motor portion 156. A bolt 192 fastens the retainer 186 to the yoke 182. The manner in which the retainer 186 cooperates with the friction elements 138 and 148 to retain the latter in the brake 110 are more completely disclosed in copending application Ser. No. 471,265 filed May 20, 1974, now U.S. Pat. No. 3,899,052.

In order to permit removal of the friction elements 138, 148 radially outwardly with respect to the rotor through the opening 184, the upper edges of the grooves 44, 46 in the preferred embodiment must be removed. Consequently, the grooves 144, 146 in the embodiment of FIGS. 5 and 6 have no upper edges. Therefore, the tongue-in-groove connection 178 between the housing 156 and the steering knuckle 126 consists of a separate groove 194 which has upper and lower edges and which faces into the recess 136. The projection 180 on the housing 156 is sufficiently long so that it is received within the groove 194. It will be noted that the groove 194 receives only the projection 180; the tabs 142 of the friction element 138 are received only in the grooves 146 to permit their removal as more completely described hereinabove.

I claim:

1. In a disc brake, a rotor having a pair of friction faces, a pair of friction elements, one of said elements being disposed adjacent each of said friction faces, a member straddling said rotor and engaging each of said friction elements for urging each of the latter into braking engagement with their corresponding friction faces when a brake application is effected, a fixed support member disposed in a plane adjacent said rotor, one side of said support member facing said rotor, and means slidably mounting said straddling member on said support member for transverse movement with respect to said rotor, said slidably mounting means including pin means located radially inwardly of the periphery of said rotor and rigidly connected with said support member, said pin means projecting from the side of said support member opposite the side of the latter facing the disc, an opening in the other member receiving said pin means, said opening defining a bearing surface circumscribing the pin means, and a tongue-in-groove connection on the corresponding cooperating edges of said straddling member and on said support member to restrain rotation of said straddling member about said pin means, said fixed support having a pair of arms having facing surfaces defining a recess therebetween, said surfaces being disposed radially inwardly from the periphery of the rotor, one of said friction elements being located in said recess and having anchoring surfaces on opposite ends thereof cooperating with the facing surfaces of said arms to anchor said one friction element during a brake application, said tongue-in-groove connection including a groove defined on one of said facing surfaces and a tongue extending from one side of the straddling member.

2. The invention of claim 1,
said pin means including a sleeve, and a bolt extending through said sleeve and fastening into said fixed support to thereby retain said sleeve on the latter, said opening embracing said sleeve.

3. The invention of claim 2,
the end of said sleeve engaging said fixed support having a tapered section engaging a corresponding tapered recess in the fixed support.

4. In a disc brake, a rotor having a pair of friction faces, a pair of friction elements, one of said elements being disposed adjacent each of said friction faces, a member straddling said rotor and engaging each of said friction elements for urging each of the latter into braking engagement with their corresponding friction faces when a brake application is effected, a fixed support member disposed in a plane adjacent said rotor, one side of said support member facing said rotor, and means slidably mounting said straddling member on said support member for transverse movement with respect to said rotor, said slidable mounting means including pin means located radially inwardly of the periphery of said rotor and rigidly connected with said support member, said pin means projecting from the side of said support member opposite the side of the latter facing the disc, an opening in the other member receiving said pin means, said opening defining a bearing surface circumscribing the pin means, and a tongue-in-groove connector on the corresponding cooperating edges of said straddling member and on said support member to restrain rotation of said straddling member about said pin means, said fixed support having a pair of arms having facing surfaces defining a recess therebetween, one of said friction elements being located in said recess and having anchoring surfaces on opposite ends thereof, one of said anchoring surfaces being a tab projecting from said one friction element, said tongue-in-groove connection including a groove in one of said facing surfaces receiving said tab and also receiving a tongue extending from said straddling member.

5. The invention of claim 4:
said pin means including a sleeve, and a bolt extending through said sleeve and fastening into said fixed support to thereby retain said sleeve on the latter, said opening embracing said sleeve.

6. The invention of claim 5:
the end of said sleeve engaging said fixed support having a tapered section engaging a corresponding tapered recess in the fixed support.

* * * * *